United States Patent [19]

Takata et al.

[11] Patent Number: 4,850,655
[45] Date of Patent: Jul. 25, 1989

[54] HYDRAULIC BOOSTER

[75] Inventors: Koji Takata; Yoshiki Matsuzaki, both of Itami, Japan

[73] Assignee: Sumitomo Electric Industries, Ltd., Osaka, Japan

[21] Appl. No.: 209,903

[22] Filed: Jun. 22, 1988

[30] Foreign Application Priority Data

Jun. 24, 1987 [JP] Japan .................. 62-158705

[51] Int. Cl.$^4$ ................. B60T 15/04; B60T 13/14
[52] U.S. Cl. ..................... 303/50; 188/358; 60/547.1; 60/548
[58] Field of Search .............. 303/50, 51, 52, 53, 303/54, 56; 188/358, 359; 60/548, 547.1, 554, 555, 562, 564, 568, 573, 581; 91/369 R

[56] References Cited

U.S. PATENT DOCUMENTS

| | | | |
|---|---|---|---|
| 2,698,205 | 12/1954 | Gagen | 188/358 X |
| 2,757,512 | 8/1956 | Foreman | 188/359 X |
| 2,887,187 | 5/1959 | Fletcher et al. | 188/358 |
| 2,992,533 | 7/1961 | Hodkinson | 188/359 X |
| 3,074,383 | 1/1963 | Schultz | 188/359 X |
| 3,515,441 | 6/1970 | Stein | 188/359 X |
| 4,181,371 | 1/1980 | Adachi | 303/50 |
| 4,284,309 | 8/1981 | Hoefer | 303/50 |
| 4,443,040 | 4/1984 | Farr | 303/50 |
| 4,444,440 | 4/1984 | Farr | 303/50 |
| 4,463,561 | 9/1984 | Leiber | 60/547.1 |
| 4,563,043 | 1/1986 | Scheuering | 303/52 |

Primary Examiner—Douglas C. Butler
Attorney, Agent, or Firm—Cushman, Darby & Cushman

[57] ABSTRACT

A hydraulic booster including a power piston, a boost chamber for applying a boost pressure to the power piston, an input rod, an intermediate inlet chamber for introducing a power source pressure thereinto, a valve mechanism provided in a valve chamber of the power piston and a differential pressure regulating valve subjected to a valve opening pressure equal to a sum of a spring pressure and a pressure of the boost chamber and a valve closing pressure equal to a pressure of the intermediate inlet chamber so as to control opening and closing of a communicating path for introducing the power source pressure into the intermediate inlet chamber such that pressure of the intermediate chamber is kept higher than the pressure of the boost chamber by a predetermined value at all times.

7 Claims, 3 Drawing Sheets

HYDRAULIC BOOSTER

BACKGROUND OF THE INVENTION

The present invention generally relates to hydraulic boosters for amplifying an input operational force by using a hydraulic power and more particularly, to a hydraulic booster which is suitable for obtaining amplified output of a hydraulic master cylinder for generating a braking force of a motor vehicle.

Conventionally, in valve portion of a hydraulic booster used in a master cylinder of a motor vehicle, relative position of an input rod and a power piston is detected such that the valve is opened or closed in accordance with the relative position of the input rod and the power piston. Namely, when the power piston is retracted relative to the input rod, a power source pressure for amplification is introduced into a boost chamber. On the other hand, when the power piston is advanced relative to the input rod, the boost chamber is communicated with a reservoir such that the boost chamber is depressurized. Meanwhile, generally, a small neutral zone is provided for controlling rise and fall of pressure in the boost chamber. Thus, when the power piston is disposed at a neutral position relative to the input rod, a pressure in the boost chamber, i.e. a boost pressure is maintained at a constant value.

In order to perform the above described control in the known hydraulic booster, it is necessary either to provide the valve portion in the power piston such that the valve portion is displaced together with the power piston and the input rod, or, to detect the above described relative displacement between the power piston and the input rod such that the detected result is transmitted to the valve portion provided at another fixed location.

In the above described two methods, a transmission mechanism (link mechanism) is indispensable in the latter method, so that the latter method becomes complicated and expensive. Hence, in most cases, the former method is employed. However, in the former method, the power source pressure is required to be introduced into the power piston. To this end, it is necessary to employ either a first method in which a valve chamber in the power piston and a supply passage of the power source pressure are communicated with each other by a flexible hose or a second method in which an annular intermediate inlet chamber is formed on an outer periphery of the power piston so as to be slidably isolated by two high-pressure seals and is communicated with the valve chamber in the power piston by a hole formed on the power piston. However, the flexible hose of the first method poses various problems such as large setting space, low resistance against vibration, short service life, etc. and thus, is not suitable for practical use. Therefore, the second method, i.e. the intermediate inlet chamber is generally employed.

One concrete example of a prior art arrangement employing this second method is shown in FIG. 1. In FIG. 1, a power piston 1 is axially movably fitted into a bore of a booster body 2. An input rod 3 is provided rearwards of the power piston 1. A spool valve 4 is axially slidably fitted into a valve chamber in the power piston 1. A boost chamber 5 is formed for applying a boost pressure to a portion of a rear face of a stepped portion of the power piston 1. An intermediate inlet chamber 6 for introducing a power source pressure thereinto is provided between an inner face of the bore of the booster body 2 and an outer periphery of the power piston 1 and is communicated with an output circuit of a pump 11. High-pressure seals 7 and 8 are provided for slidably sealing right and left opposite ends of the intermediate inlet chamber 6. This prior art arrangement further includes a return spring 9 for returning the power piston 1 to its original position, a return spring 10 for returning the spool valve 4 to its original position, a reservoir 12 and an accumulator 13.

When the spool valve 4 is not present in the valve chamber in the power piston 1, the valve chamber is, respectively, communicated, via holes 14, 15 and 16 formed on the power piston 1, with the intermediate inlet chamber 6, the boost chamber 5 and a depressurizing path 17 for the boost chamber 5, which leads to the reservoir 12. The spool valve 4 forms a valve portion between the holes 14 and 16 so as to open and close a hydraulic path between the intermediate inlet chamber 6 and the boost chamber 5 and a hydraulic path between the boost chamber 5 and the depressurizing path 17. Namely, when an operational input is zero and a passage 18 formed in the spool valve 4 coincides, in position, with the hole 16, the spool valve 4 cuts off communication between the holes 14 and 15 formed through the valve chamber so as to release pressure in the boost chamber 5.

On the other hand, when the input rod 3 has been depressed, relative displacement of the input rod 3 and the power piston 1 is transmitted to the spool valve 4. Thus, the spool valve 4 is displaced in the leftward direction in FIG. 1 so as to cut off communication between the hole 16 and the passage 18 initially. Thereafter, with a slight delay, the holes 14 and 15 are communicated with each other. Hence, the power pressure transmitted from the intermediate inlet chamber 6 is introduced into the boost chamber 5 so as to depress the power piston 1. Therefore, in this prior art arrangement, a piston 19 for generating hydraulic pressure is advanced such that a hydraulic pressure obtained by amplifying the operational input of the input rod 3 in proportion thereto is outputted from a cylinder 20. Meanwhile, reference numeral 21 denotes a liquid replenishment chamber for the cylinder 20 communicating with the reservoir 12.

The conventional hydraulic booster referred to above has such a drawback that since the intermediate inlet chamber 6 is directly connected with the power source, the seals 7 and 8 are subjected to the high power source pressure at all times and thus, sliding resistance forces of the seals 7 and 8 become excessively large.

Meanwhile, due to the above described fact, an urging force of the return spring 9 also should be large. Namely, in apparatuses of this kind, the return spring is required to return the advanced piston to its original position at the time of release of the operational force. The urging force of the return spring should be larger than a total of sliding resistance forces of the seals 7 and 8 and a seal for the piston 19. However, if the sliding resistance forces of the seals 7 and 8 are large, the urging force of the return spring 9 should also be large accordingly. Therefore, in the prior art hydraulic booster, a resistance force against advance of the piston amounts to an addition of the high sliding resistance forces of the seals and the large urging force of the return spring 9. Until a counterforce produced by the pressure of the boost chamber 5 exceeds the resistance force against advance of the piston, the power piston 1 cannot advance. Accordingly, the prior art hydraulic booster has such inconveniences that the start of production of the output pressure in the chamber 20 is delayed especially at an initial stage of operation and the pressure in the boost chamber 5 becomes much higher than the pressure produced in the chamber 20.

SUMMARY OF THE INVENTION

Consequently, an essential object of the present invention is to provide a hydraulic booster having excellent performances, with substantial elimination of the disadvantages inherent in conventional hydraulic boosters of this kind.

In order to accomplish this object of the present invention, a hydraulic booster according to the present invention comprises a differential pressure regulating valve provided upstream of an intermediate inlet chamber so as to open and close a communicating path between a source of a power source pressure and the intermediate inlet chamber by a differential pressure existing between a pressure of a boost chamber and a pressure of the intermediate inlet chamber such that the pressure of the intermediate inlet chamber is kept higher than the pressure of the boost chamber by a predetermined value.

In the hydraulic booster, if the direct introduction of the power source pressure into the intermediate inlet chamber is prevented and the pressure of the intermediate inlet chamber is kept slightly higher than the pressure of the boost chamber, a pressure applied to the seals of the intermediate inlet chamber at an initial stage of operation, in which the pressure of the boost chamber assumes zero or a minute value, is restricted to only the differential pressure between the intermediate inlet chamber and the boost chamber. Thus, the sliding resistance forces of the seals at an initial stage of operation is reduced drastically.

Thus, a preset load of the return spring can be made small. By the above described two effects gained by the present invention, delay of start of production of the output pressure at an initial stage of operation and undesirable rise of the pressure of the boost chamber can be lessened remarkably.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
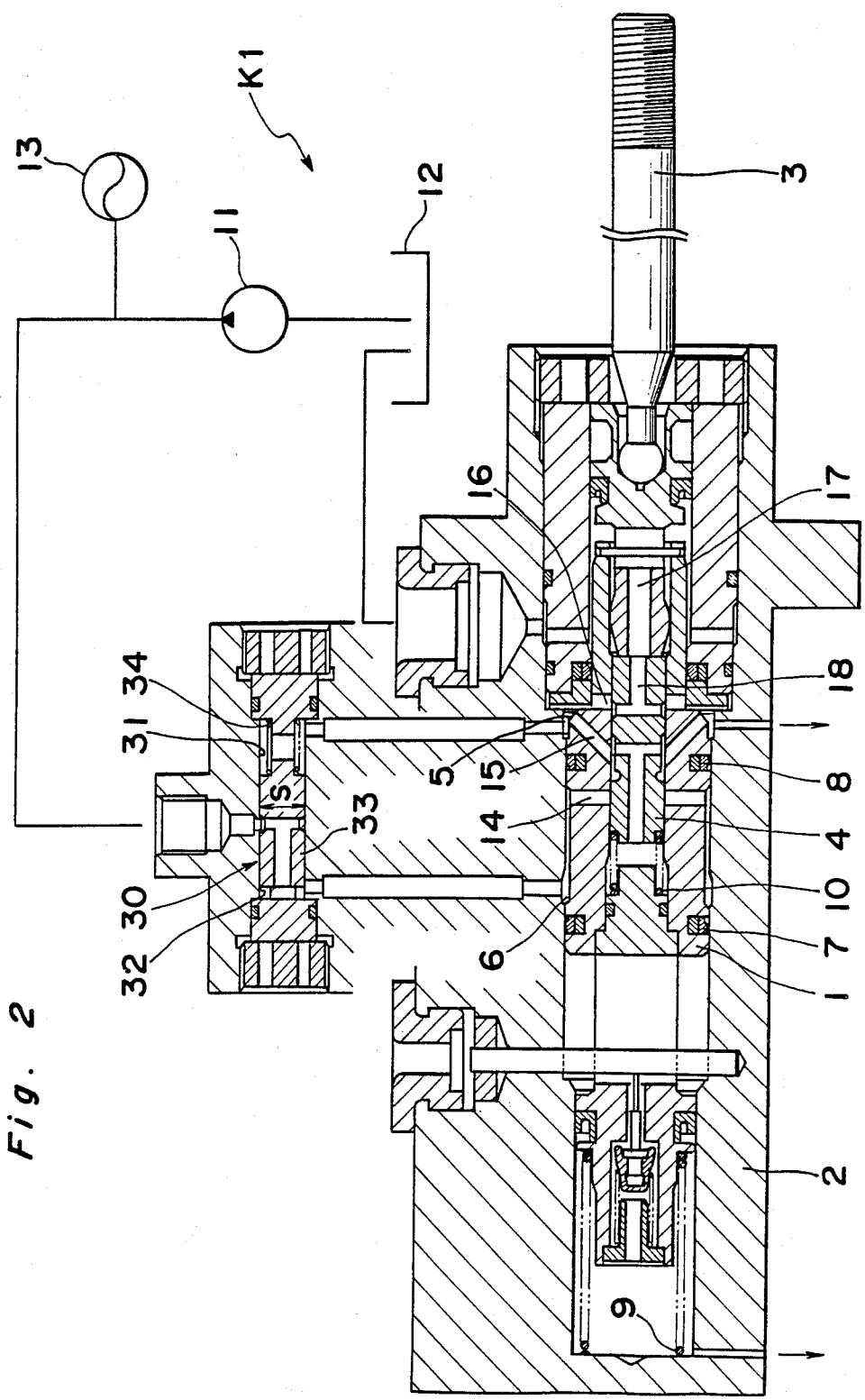
FIG. 2 is a sectional view of a hydraulic booster according to a first embodiment of the present invention.

Referring now to the drawings, there is shown in FIG. 2, a hydraulic booster K1 according to a first embodiment of the present invention. The booster K1 includes a power piston 1 axially movably provided in a bore of a booster body 2, an input rod 3 provided rearwards of the power piston 1 and a spool valve 4 axially slidably fitted into a valve chamber in the power piston 1. A boost chamber 5 is formed for applying a boost pressure to a portion of a rear face of a stepped portion of the power piston 1. An intermediate inlet chamber 6 for introducing a power source pressure thereinto is provided between an inner face of the bore of the booster body 2 and an outer periphery of the power piston 1 and is communicated with an output circuit of a pump 11. High-pressure seals 7 and 8 are provided for slidably sealing right and left opposite ends of the intermediate inlet chamber 6.

The booster K1 further includes a return spring 9 for returning the power piston 1 to its original position, a return spring 10 for returning the spool valve 4 to its original position, a reservoir 12 and an accumulator 13. Furthermore, the power piston 1 is formed with a hole 14 for connecting the intermediate inlet chamber 6 and the valve chamber in the power piston 1, a hole 15 for connecting the boost chamber 5 and the valve chamber and a hole 16 for connecting the valve chamber and a depressurizing path 17 for the boost chamber 5, which leads to the reservoir 12. Meanwhile, the spool valve 4 is formed with a passage 18.

In the booster K1, a differential pressure regulating valve 30 employing a spool valve is provided upstream of the intermediate inlet chamber 6. The differential pressure regulating valve 30 is constituted by a spool valve 33 and an offset spring 34 for urging the spool valve 33 towards a chamber 32 communicating with the intermediate inlet chamber 6. The spool valve 33 confronts, at its one end, a chamber 31 communicating with the boost chamber 5 and, at the other end, the chamber 32. Meanwhile, an offset pressure Pd is obtained by dividing an urging force F of the offset spring 34 by a cross-sectional area S of the spool valve 33, i.e. $Pd = F/S$. If a differential pressure between a pressure of the intermediate inlet chamber 6 and the boost pressure, i.e. a pressure of the boost chamber 5 is smaller than the offset pressure Pd, the spool valve 33 is displaced in the leftward direction in FIG. 2. Thus, a communicating path between the output circuit of the pump 11 and the chamber 32 is opened so as to introduce a power source pressure into the intermediate inlet chamber 6.

Meanwhile, when the differential pressure between the pressure of the intermediate inlet chamber 6 and the pressure of the boost chamber 5 is increased, the spool valve 33 is displaced in the rightward direction in FIG. 2 so as to close the above described communicating path. Thus, the pressure P1 of the intermediate inlet chamber 6 is kept to a value obtained by adding the offset pressure Pd to the boost pressure, i.e. the pressure P2 of the boost chamber 5, so that the spool valve 33 is held at such a position that an equation of $(P1 = P2 + Pd)$ is satisfied.

Therefore, the pressure applied to the seals 7 and 8 is reduced. Especially, at an initial stage of operation, the present invention achieves such a remarkable effect that only the offset pressure Pd is applied to the seals 7 and 8 by action of the differential pressure regulating valve 30 in the booster K1 in contrast with the prior art booster of FIG. 1 in which a whole of the power source pressure is applied to the seals 7 and 8. Furthermore, since the urging force of the return spring 9 can be reduced by amount corresponding to the decrease of the sliding resistance force, this effect is doubled at an initial stage of operation. Accordingly, in accordance with the present invention, performances of the booster are remarkably improved especially at an initial stage of operation.

Figure 3:
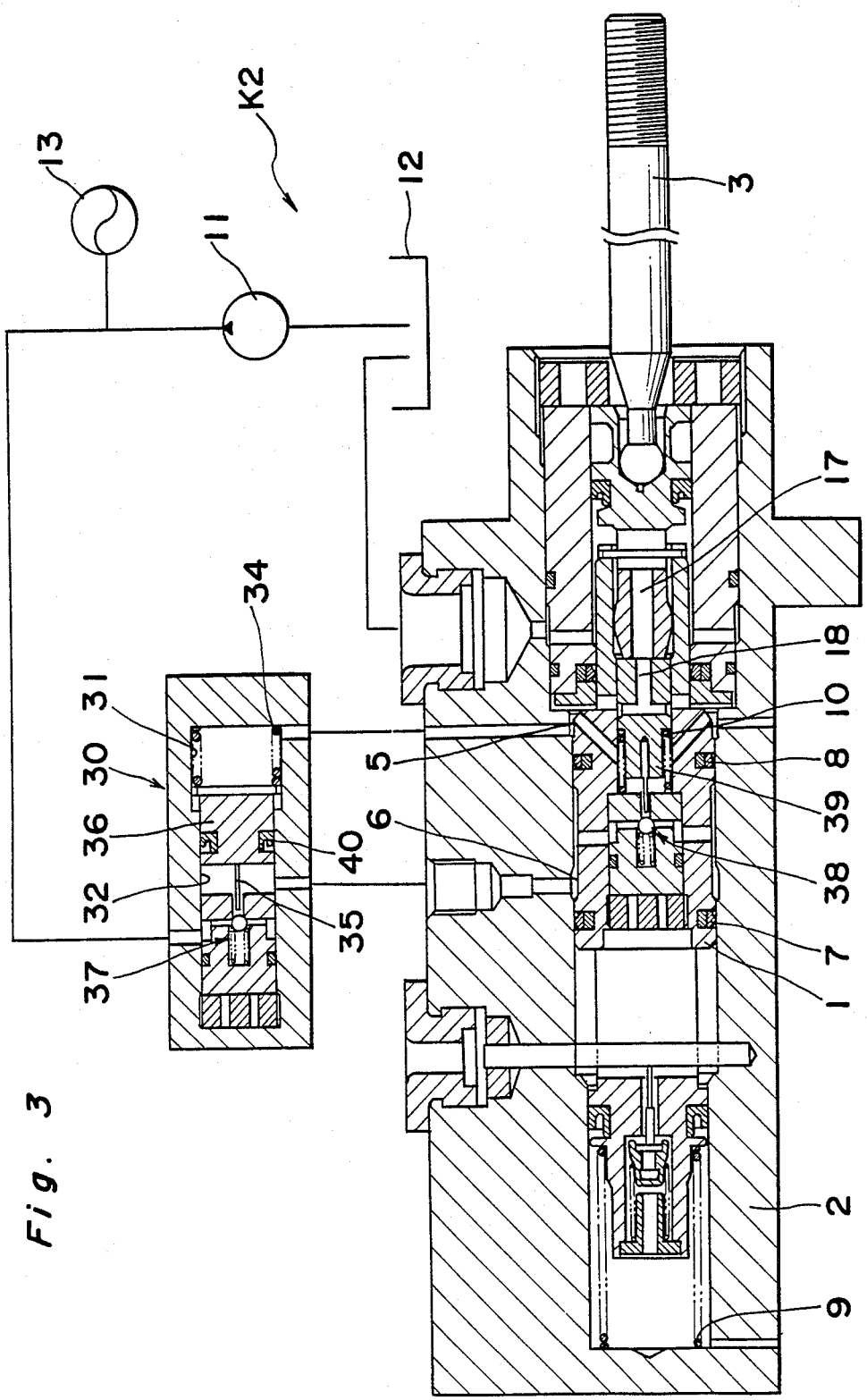
FIG. 3 is a view similar to FIG. 2, particularly showing a second embodiment of the present invention.

Referring further to FIG. 3, there is shown a hydraulic booster K2 according to a second embodiment of the present invention. In the booster K2, the differential pressure regulating valve 30 is constituted by a piston 36 having a push pin 35, an offset spring 34 for urging the piston 36 towards the chamber 32 and a ball valve 37 for opening and closing a communicating path to the chamber 32 subjected to the power source pressure such that the ball valve 37 is opened and closed upon displacement of the piston 36.

Meanwhile, in the valve mechanism in the power piston 1 of the booster K2, the spool valve 4 of the booster K1 is replaced by a ball valve 38 at its inlet side, while a spool valve 39 is employed at its outlet side in the same manner as the booster K1. Since the ball valve 38 is employed for opening and closing a hydraulic path of the inlet side, there is no possibility of liquid leakage in nonoperational state of the booster K2, which leakage may occur in the booster K1. Thus, clearance tolerance of the spool portion can be increased, thereby resulting in reduction of production cost of the booster K2.

Likewise, in order to prevent liquid leakage in the differential pressure regulating valve 30, a seal 40 is employed such that tolerance of clearance between the piston 36 and the corresponding bore can be increased.

Figure 1:
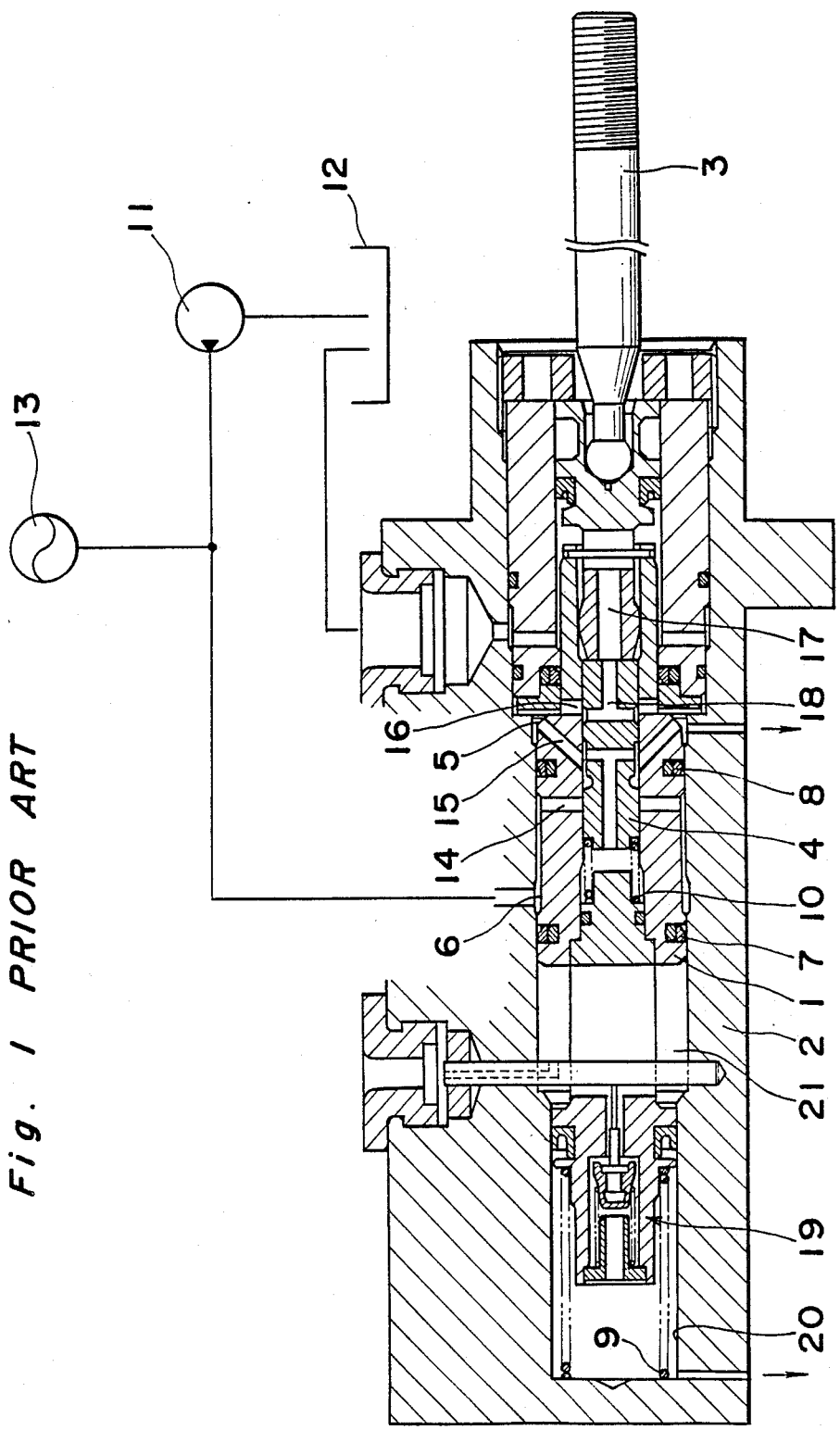
FIG. 1 is a sectional view of a prior art hydraulic booster (already referred to)

Meanwhile, if the ball valve 38 is employed in the prior art booster of FIG. 1, it is necessary to open the ball valve 38 against the power source pressure of the intermediate inlet chamber 6 at an initial stage of operation by depressing the ball away from the opening. Thus, loss of the initial operational force is increased. On the other hand, in accordance with the present invention, since the pressure of the intermediate inlet chamber drops by action of the differential pressure regulating valve, such an additional effect is brought about that the above described loss of the initial operational force is lessened. Since other constructions of the booster K2 are similar to those of the booster K1, description thereof is abbreviated for the sake of brevity. Meanwhile, it is to be noted that types of valves such as ball valve and spool valve employed in the differential pressure regulating valve 30 and the inlet and outlet valves of the power piston 1 can be selected arbitrarily.

As is clear from the foregoing description, in the boosters K1 and K2, the differential pressure regulating valve 30 having simple construction is additionally provided so as to drastically reduce the sliding resistance forces of the seals 7 and 8 especially at an initial stage of operation.

Therefore, in accordance with the present invention, since the pressure of the boost chamber 5 or the output pressure is so maintained as to be more accurately proportional to the operational force of the input rod 3 excellent operational feeling can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A hydraulic booster comprising:
   a booster body having a bore therein;
   a power piston fitted into said bore so as to be axially slidable between an original position and other positions within said bore;
   a return spring for returning said power piston to said original position;
   an annular boost chamber for applying a boost pressure to a part of a rear face of said power piston;
   an input rod which is disposed rearwards of and extends into said power piston so as to be axially movable relative to said power piston;
   means for sealing an outer periphery of said power piston;
   an intermediate inlet chamber for introducing a power source pressure thereinto, which is provided between an inner periphery of the bore of said booster body and the outer periphery of said power piston;
   a valve mechanism which is provided in a valve chamber of said power piston, which the valve chamber being communicated with said intermediate inlet chamber, said boost chamber and a depressurizing path, said valve mechanism including a movable member, said movable member being actuated in response to relative axial displacement of said power piston and said input rod such that said valve mechanism opens and closes a hydraulic path between said intermediate inlet chamber and said boost chamber and a hydraulic path between said boost chamber and said depressurizing path for the purpose of controlling rise and drop of a pressure of said boost chamber; and
   a differential pressure regulating valve which is subjected to a first pressure applied in a direction for opening said differential pressure regulating valve and a second pressure applied in a direction for closing said differential pressure regulating valve so as to control opening and closing of a communicating path for introducing the power source pressure into said intermediate inlet chamber, the first pressure being equal to a sum of a spring pressure and the pressure of said boost chamber, while the second pressure is equal to a pressure of said intermediate inlet chamber such that a pressure difference between the pressure in said intermediate inlet chamber and the pressure in said boost chamber is kept constant at a predetermined value despite the power source pressure as far as the power source pressure is higher than the pressure in said boost chamber by the predetermined value.

2. A hydraulic booster as claimed in claim 1, wherein said differential pressure regulating valve includes a spool valve and a spring for urging said spool valve.

3. A hydraulic booster as claimed in claim 2, wherein said valve mechanism includes a spool valve.

4. A hydraulic booster as claimed in claim 2, wherein said valve mechanism includes a ball valve and a spool valve.

5. A hydraulic booster as claimed in claim 1, wherein said differential pressure regulating valve includes a piston, a spring for urging said piston and a ball valve.

6. A hydraulic booster as claimed in claim 5, wherein said valve mechanism includes a spool valve.

7. A hydraulic booster as claimed in claim 5, wherein said valve mechanism includes a ball valve and a spool valve.

* * * * *